Nov. 7, 1950  H. B. JAYNES  2,529,082
ELECTRICALLY OPERATED SPEEDOMETER
FOR AUTOMOTIVE VEHICLES
Filed Oct. 3, 1947
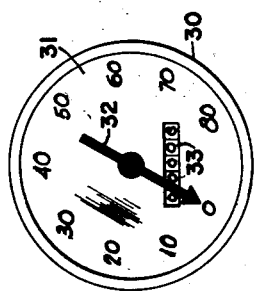
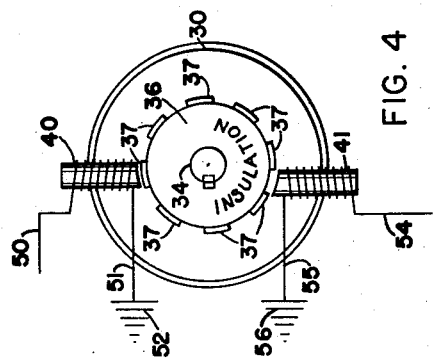
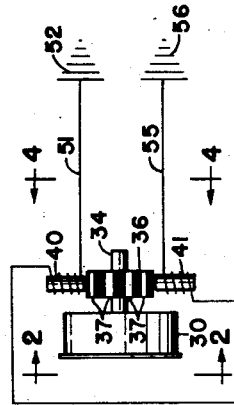
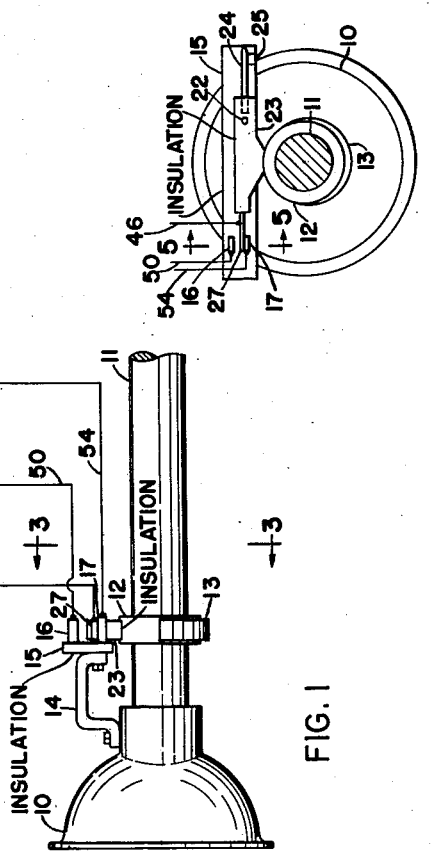
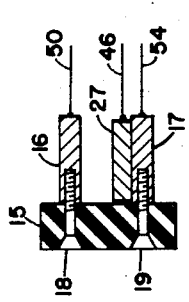
HAL B. JAYNES
Inventor
By *[signature]*
Attorney Patented Nov. 7, 1950

2,529,082

UNITED STATES PATENT OFFICE 2,529,082

ELECTRICALLY OPERATED SPEEDOMETER FOR AUTOMOTIVE VEHICLES

Hal B. Jaynes, Lenoir, N. C.

Application October 3, 1947, Serial No. 777,724

3 Claims. (Cl. 318—27)

This invention relates to an electrically operated speedometer for an automotive vehicle in which the speedometer is driven by electrical impulses controlled by a driven part of the vehicle such as the main drive shaft.

It is an object of this invention to provide an electrically driven speedometer for an automotive vehicle in which a driven part of the vehicle, such as the main drive shaft, makes and breaks an electrical circuit and passes electrical current through a pair of coils to impart rotation to the speedometer shaft, instead of the shaft being driven from a flexible shaft connected to a driven part of the vehicle.

Some of the objects of the invention having been stated, other objects will appear as the description proceeds when taken in connection with the accompanying drawings, in which Figure 1 is an elevation of a portion of the drive shaft of an automotive vehicle and showing the invention in schematic form;

Figure 2 is an elevation taken along the line 2—2 in Figure 1;

Figure 3 is a view partly in section and partly in elevation and taken along the line 3—3 in Figure 1;

Figure 4 is a view partly in elevation and partly schematic and taken along the line 4—4 in Figure 1;

Figure 5 is an enlarged vertical sectional view taken along the line 5—5 in Figure 3.

Referring more specifically to the drawings, the numeral 10 indicates a portion of a transmission housing of an automotive vehicle having extending therefrom a driven drive shaft 11. This drive shaft has a collar 12 fixedly secured thereon having a raised cam portion 13. The housing 10 has a bracket 14 mounted thereon on which an insulation block 15 is mounted. This insulation block 15 has a pair of contact members 16 and 17 secured on one face thereof in spaced relation to each other, by any suitable means such as screws 18 and 19 respectively.

Pivotally mounted on the insulation block 15, as at 22, is an insulation member 23, which has imbedded in one end thereof a leaf spring member 24 which is adapted to rest on a projection 25 extending from one side of the block 15. The end of the insulation member 23, remote from the leaf spring 25, has a contact member 27 secured therein and extending therefrom between the contact members 16 and 17.

There is a conventional speedometer housing 30, having a dial 31 and a hand 32, to indicate the miles per hour being traveled and a plurality of counting wheels 33 to indicate the number of miles traveled by the vehicle. The interior mechanism within the housing 30 is conventional and a detailed showing of the same is deemed unnecessary.

There is a shaft 34 extending into the housing 30 in a conventional manner for driving the mechanism of the speedometer. Fixedly mounted on the shaft 34 is an insulation disk 36 having a plurality of soft iron members 37 disposed in spaced relation to each other around its periphery.

Mounted approximately 180 degrees apart from each other and close to the periphery of the disk 36 is a pair of electro-magnets 40 and 41. The battery of the automotive vehicle is indicated at 42 and is grounded in a conventional manner as at 43. A wire 44 leads therefrom through an ignition switch 45. A wire 46 leads from the other side of the ignition switch and is connected to the contact member 27. A wire 50 leads from contact member 15 to one side of the magnet 40, and a wire 51 leads from the other side of the magnet 40 and is grounded as at 52. From the other contact 17, mounted on insulation block 15, a wire 54 is led to one end of magnetic coil 41 and a wire 55 leads from the other end of the magnetic coil and is grounded as at 56.

When the ignition switch 45 is closed and forward motion is imparted to the vehicle, the raised portion 13 will move the insulation member 23 on its pivot 22 in an up and down manner and when member 23 is raised, the contact 27 will engage the fixed contact member 16 and current will be passed through the magnet 40 to move the disk 37 a pre-determined amount, and then when the raised portion 13 has passed the downwardly projecting portion on the member 23, the spring 24 will cause it to follow the disk 12, and on the lower side of the cam comprising disk 12 and raised portion 13, the member 23 will be in the position shown in Figures 1 and 3, and the member 27 will engage the fixed contact 17 which will pass an electrical current through magnet 41 and impart another step of rotation to the shaft 34. In this manner upon each impulse being delivered to the magnets 40 and 41 the shaft 34 will be rotated in step by step relation to operate the speedometer mechanism. The insulation disk 36 tends to retard the flow of magnetism between the members 37 and also retards the flow of magnetic lines of force to the shaft 34.

In the drawings and specification there has been set forth a preferred embodiment of the invention, and although specific terms are employed, they are used in a generic and description sense only and not for purposes of limitation, the scope of the invention being defined in the claims.

I claim:

1. An electrical speedometer comprising a speedometer having a shaft for driving the same extending therefrom, a circular insulation member mounted on the shaft and having a plurality of spaced soft iron members along its periphery, a pair of magnets disposed in spaced relation around the periphery of the member having the soft iron members thereon, a switch having a pair of fixed contacts and a movable switch member, the fixed contacts being connected to the magnets, a source of electrical energy and a connection between the source of electrical energy and the movable switch member, cam means on a driven portion of the vehicle for imparting oscillatory motion to the movable switch member for causing it to alternately engage the two fixed contact members to pass current alternately through the magnets to impart rotation to the speedometer shaft, whereby said insulation member diminishes and retards the force of the magnetism transmitted from a soft iron member adjacent the energized magnet to those soft iron members disposed remotely from the energized magnet and whereby those soft iron members disposed remotely from the energized magnet will not be as strongly attracted to the magnet which is not energized as would be the case if the soft iron members were not insulated from one another.

2. In an electrically operated speedometer having a shaft extending therefrom, a circular insulation disk member mounted on the shaft and having a plurality of soft iron plates disposed around the periphery of the circular insulation disk member in spaced relation to each other, a pair of magnets disposed in close proximity to the periphery of the disk member and in spaced relation to each other, a pair of fixed contact members and a movable contact member disposed therebetween, connections between the two fixed contact members and the magnets, a source of electrical energy connected to the movable contact member and means driven by the forward motion of the vehicle for imparting oscillatory motion to the movable contact member to cause it to alternately engage the two fixed contact members to alternately pass current through the two magnets to attract each of the soft iron members of said disk successively to thereby impart rotary motion to the shaft of the speedometer, said circular insulation disk member serving to diminish and retard the force of the magnetism transmitted from a soft iron member adjacent the energized magnet to those soft iron members disposed remotely from the energized magnet so as to minimize the attraction of the soft iron members disposed remotely from the energized magnet to the non-energized magnet.

3. In an automotive vehicle, a speedometer having a shaft extending therefrom, a pair of magnets associated with said shaft, a plurality of spaced magnetizable members disposed on said shaft, insulation means disposed between each of the magnetizable members and also being disposed between the magnetizable members and the shaft, a switch member having a pair of contacts connected to the two magnets and a movable switch member disposed therebetween and means driven by the motion of the vehicle for imparting oscillatory motion to the movable switch member to alternately energize the two magnets to cause rotation of the speedometer shaft, said insulation means tending to diminish and retard the force of the magnetism transmitted from a magnetizable member adjacent an energized magnet to those magnetizable members disposed remotely from the energized magnet so as to minimize the attraction of the magnetizable members disposed remotely from the energized magnet, to the non-energized magnet.

HAL B. JAYNES.

REFERENCES CITED

The following references are of record in the file of this patent:

UNITED STATES PATENTS

| Number | Name | Date |
|---|---|---|
| 921,280 | Radtke | May 11, 1909 |
| 1,371,096 | Howe et al. | Mar. 8, 1921 |
| 1,502,840 | Beard | July 29, 1924 |
| 2,249,029 | Mullerheim | July 15, 1941 |